US009479439B1

(12) United States Patent
Pogde et al.

(10) Patent No.: US 9,479,439 B1
(45) Date of Patent: *Oct. 25, 2016

(54) METHODS AND APPARATUS FOR LOAD BALANCING VLAN TRAFFIC

(71) Applicant: Juniper Networks, Inc., Sunnyvale, CA (US)

(72) Inventors: Pranay Pogde, Sunnyvale, CA (US); James Murphy, Alameda, CA (US); Abhijit Choudhury, Cupertino, CA (US); Raghavendra Mallya, Cupertino, CA (US); Sandeep Bajaj, San Ramon, CA (US); Bharani Chadalavada, San Jose, CA (US); Rajagopalan Sivaramakrishnan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/011,128

(22) Filed: Jan. 29, 2016

Related U.S. Application Data

(63) Continuation of application No. 13/627,622, filed on Sep. 26, 2012, now Pat. No. 9,253,123.

(51) Int. Cl.
*H04L 12/26* (2006.01)
*H04L 12/803* (2013.01)
*H04L 12/46* (2006.01)

(52) U.S. Cl.
CPC ......... *H04L 47/125* (2013.01); *H04L 12/4641* (2013.01)

(58) Field of Classification Search
CPC ............. H04L 47/125; H04L 12/4675; H04L 12/4641; H04L 12/4679; H04L 29/14
See application file for complete search history.

(56) References Cited

U.S. PATENT DOCUMENTS

| | | | | |
|---|---|---|---|---|
| 2008/0239946 | A1* | 10/2008 | Morita | H04L 41/0677 370/217 |
| 2009/0296565 | A1* | 12/2009 | Kuo | H04L 45/00 370/219 |
| 2010/0182937 | A1* | 7/2010 | Bellagamba | H04L 12/462 370/256 |
| 2012/0147737 | A1* | 6/2012 | Taylor | H04L 41/0663 370/219 |

* cited by examiner

*Primary Examiner* — Thai Nguyen
(74) *Attorney, Agent, or Firm* — Cooley LLP (57) ABSTRACT

In some embodiments, an apparatus includes a first core device configured to be disposed within a network. The network has a set of access nodes and a second core device. The first core device is configured to receive a signal designating the first core device as a master device for a virtual group identifier such that the second core device is designated as a back-up device for that virtual group identifier.

20 Claims, 4 Drawing Sheets

| Virtual Group Identifier Table 300 | |
|---|---|
| Virtual Group Identifier 320 | Status 340 |
| Identifier 1 | Master |
| Identifier 2 | Back-up |
| Identifier 3 | Master |
| Identifier 4 | Back-up |
| Identifier 5 | N/A |

METHODS AND APPARATUS FOR LOAD BALANCING VLAN TRAFFIC

CROSS REFERENCE TO RELATED APPLICATIONS

This application is a continuation of U.S. patent application Ser. No. 13/627,622 filed on Sep. 26, 2012, entitled "Methods and Apparatus for Load Balancing VLAN Traffic," the contents of which are incorporated herein by reference.

BACKGROUND

Some embodiments described herein relate generally to load balancing of VLAN traffic in converged wired and wireless networks.

In some known networks that include multiple VLANs and core devices, devices associated with a VLAN are typically distributed across multiple subnets associated with different core devices. To route VLAN traffic in such known networks, all core devices typically advertise their subnet routes for VLANs to upstream routers, which then send downstream VLAN traffic to all core devices using, for example, Equal-Cost Multi-Path (ECMP) routing. In such a method, however, some of the VLAN traffic crosses inter-core links to be forwarded towards destined users, wasting bandwidth of inter-core links and excessively occupying ports of the core devices. Additionally, accounting and policing functions for traffic of a VLAN are implemented at multiple core devices in a distributed fashion, which increases the complexity of core devices and makes it difficult to manage VLAN traffic.

To solve the problem of VLAN traffic crossing inter-core links, some other known networks implement a host-routing solution for core devices to advertise host-specific routes. Such a host-routing solution, however, typically leads to the significant increase in the number of routing table entries and inefficient use of routing protocols.

Accordingly, a need exists for methods and apparatus that enable centralized accounting and policing for VLAN traffic at an anchoring point, and load balancing of VLAN traffic with efficient inter-core link utilization without the significant increase in the number of routing table entries.

SUMMARY

In some embodiments, an apparatus includes a first core device configured to be disposed within a network. The network has a set of access nodes and a second core device. The first core device is configured to receive a signal designating the first core device as a master device for a virtual group identifier such that the second core device is designated as a back-up device for that virtual group identifier.

DETAILED DESCRIPTION

In some embodiments, an apparatus includes a first core device configured to be disposed within a first network. The first network has a set of access nodes and a second core device. The first core device is configured to receive a signal designating the first core device as a master device for a virtual group identifier such that the second core device is designated as a back-up device for that virtual group identifier. After being designated as the master device for the virtual group identifier, the first core device can be configured to receive a data unit having the virtual group identifier such that the second core device does not receive the data unit.

In some embodiments, the first core device can be configured to receive a data unit having the virtual group identifier and associated with an access node from the set of access nodes such that the second core device does not receive the data unit. In response to receiving the data unit, the first core device can be configured to send the data unit to a second network different than the first network such that the second core device does not send the data unit.

In some embodiments, the first core device can be configured to send to the second network a signal advertising the first core device being designated as a master device for the virtual group identifier. As a result, the first core device can be configured to receive a data unit having the virtual group identifier from the second network such that the second core device does not receive the data unit from the second network. Furthermore, in response to receiving the data unit, the first core device can be configured to send the data unit to an access node from the set of access nodes such that the second core device does not send the data unit to the access node.

In some embodiments, the first core device can be configured to receive the signal designating the first core device as the master device for the virtual group identifier for a first time period. When the first core device fails during a second time period after the first time period, the first core device can be configured to be de-designated from the master device for the virtual group identifier, such that the second core device can be designated as the master device for the virtual group identifier during the second time period.

In some embodiments, the virtual group identifier can be from a first set of virtual group identifiers mutually exclusive from a second set of virtual group identifiers. The first core device can be designated as a master device for the first set of virtual group identifiers such that the second core device can be designated as a back-up device for the first set of virtual group identifiers. Meanwhile, the first core device can be designated as a back-up device for the second set of virtual group identifiers such that the second core device can be designated as a master device for the second set of virtual group identifiers.

As used herein, a module can be, for example, any assembly and/or set of operatively-coupled electrical components, and can include, for example, a memory, a processor, electrical traces, optical connectors, software (executing in hardware), and/or the like. As used herein, the singular forms "a," "an" and "the" include plural referents unless the context clearly dictates otherwise. Thus, for example, the term "a virtual group identifier table" is intended to mean a single table or a set of tables with similar functionalities.

Figure 1:
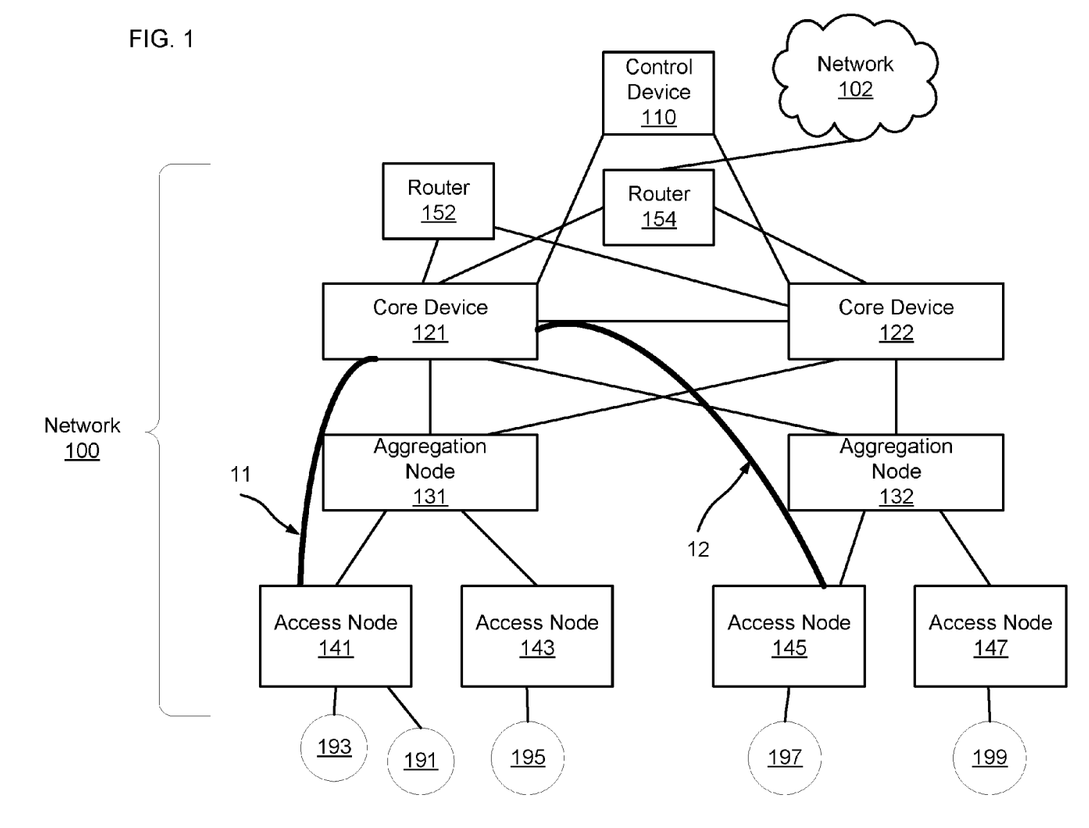
FIG. 1 is a schematic illustration of a network having multiple core devices, according to an embodiment.

FIG. 1 is a schematic illustration of a network 100 having multiple core devices, according to an embodiment. The network 100 includes multiple access nodes (e.g., access nodes 141, 143, 145 and 147), aggregation nodes (e.g., aggregation nodes 131, 132) and core devices (e.g., core devices 121, 122). The access nodes can be directly and/or operatively coupled to one or more wired or wireless user devices (e.g., user devices 191, 193, 195, 197 and 199). The network 100 also includes one or more routers (e.g., routers 152, 154) configured to couple the remaining devices within the network 100 to one or more other networks (e.g., network 102). In other embodiments, one or more routers (not shown in FIG. 1) connecting the network 100 with one or more other networks or devices can be included in the other network(s), but not included in the network 100. In such embodiments, the core devices (e.g., the core devices 121, 122) of the network 100 can communicate with the other network(s) by transmitting data units to and receiving data units from those router(s).

In some embodiments, the network 100 can be a converged network having functionalities of both a wireless network (e.g., a wireless local area network (WLAN)) and a wired network (e.g., an Ethernet). Specifically, some of the access nodes 141-147 can be, for example, a Wireless Access Point (WAP) configured to be wirelessly coupled to wireless user devices (e.g., a laptop enabled with Wi-Fi, a mobile phone); some of the access nodes 141-147 can be configured to be coupled to user devices (e.g., a computer device, a printer, a server) using wired connections (e.g., wires). In such embodiments, the network 100 can be similar to the homogeneous enterprise networks shown and described in U.S. patent application Ser. No. 13/252,852, filed Oct. 4, 2011 and entitled "Methods and Apparatus for a Converged Wired/Wireless Enterprise Network Architecture," which is incorporated herein by reference in its entirety.

The network 102 can be any network that is directly or operatively coupled to the network 100 through one or more routers (e.g., the router 154) or any other intermediary devices. For example, the network 102 can be a data center network including one or more data servers that provide information services. For another example, the network 102 can be a Wide Area Network (WAN) that is used to connect the network 100 to remote data resources. For yet another example, the network 102 can be the Internet. Typically, the network 100 can act as an access network providing, for wired or wireless users coupled to the network 100, access to data resources, applications, and information services that are located at or provided from network 102.

In the network 100, a router (e.g., the router 152, the router 154) can be any routing device configured to direct traffic (e.g., data packets, control packets) sent from and/or destined to devices within the network 100. In some embodiments, a router can be positioned upstream of a core device of the network 100, and configured to connect the core device with another network. In such embodiments, the router can be configured to send downstream traffic received from the other network to the core device, and/or send upstream traffic received from the core device to the other network (here upstream traffic and downstream traffic are identified with respect to the devices in the network 100). For example, as shown in FIG. 1, the router 154 is configured to connect the core device 121 and the core device 122 with the network 102. As a result, the router 154 can be configured to send upstream traffic received from the core device 121 and/or the core device 122 to the network 102, and send downstream traffic received from the network 102 to the core device 121 and/or the core device 122.

In the network 100, an access node (e.g., the access node 141-147) can be any device that can operatively and/or directly connect one or more wired or wireless user devices (e.g., the user devices 191-199) to the network 100. Such an access node can be, for example, a WAP, a hub, an Ethernet switch, etc. In some cases, an access node is known as an access switch, a network switch, or a switching hub. The access node 141-147 can be configured to ensure data units are delivered between one or more aggregation nodes (e.g., the aggregation nodes 131, 132) and one or more wired or wireless user devices (e.g., the user devices 191-199). In the network 100, a wired user device can be any device that can receive data units (data packets, data cells, data frames, etc.) from and/or send data units to an access node (e.g., an Ethernet switch) through a wired connection, such as a desktop computer, a workstation, a printer, etc. Similarly, a wireless user device can be any device that can receive data units from and/or send data units to an access node (e.g., a WAP) through a wireless connection, such as, for example, a mobile phone, a Wi-Fi enabled laptop, a Bluetooth earphone, etc.

In the network 100, an aggregation node (e.g., the aggregation node 131, 132) can be any device that is used to aggregate multiple access nodes and switch or route data units within the network 100, such as a router, a layer-3 switch, etc. Furthermore, the aggregation node 131-132 can be configured to transmit data units between one or more access nodes and one or more core devices that are connected to the aggregation nodes 131-132. In some embodiments, as described below, an aggregation node can be configured to transmit data units between an access node and a core device using a tunnel connecting the access node and the core device through the aggregation node.

In the network 100, a core device (e.g., the core device 121, the core device 122) can be a high-capacity switching device positioned in the physical core, or backbone, of the network 100. The core device can be configured to connect the access nodes (e.g., the access nodes 191-199) with one or more routers (e.g., the routers 152, 154), such that access to devices and information services (e.g., persistent data and applications) located at other networks (e.g., the network 102) can be provided to the user devices coupled to the network 100. In some cases, a core device is also known as a core switch, a tandem switch or a backbone switch.

In some embodiments, a core device for a converged network (i.e., a network having functionalities of both a wireless network and a wired network) can be a single device that combines for example a switch, a router, and a controller. Such a core device can be configured to manage both wired network nodes (e.g., Ethernet switch) and wireless network nodes (e.g., WAP), as well as wired and wireless user sessions. In some embodiments, a core network node in a converged network is referred to as a core SRC (switch, router, and controller).

In some embodiments, a tunnel can be established, and used to transmit data units, between a core device and an access node through one or more intervening nodes (e.g., aggregation node). Such a tunnel can be, for example, an Ethernet-over-layer-3 tunnel (e.g., a control and provisioning of wireless access points (CAPWAP) tunnel, a generic routing encapsulation (GRE) tunnel), a multiprotocol label switching (MPLS) tunnel, etc. In such embodiments, the intervening nodes can be configured to forward data units based on the corresponding tunneling protocol.

In the example of FIG. 1, the core device 121 can be configured to transmit data units to and receive data units from the access node 141 using a tunnel 11 that connects the core device 121 and the access node 141 through the aggregation node 131, or transmit data units to and receive data units from the access node 145 using a tunnel 12 that connects the core device 121 and the access node 145 through the aggregation node 132. Specifically, the core device 121 can be configured to receive encapsulated data units of a wireless session or a wired session (e.g., associated with the user device 191 or 193) from the access 141 via the tunnel 11 through the intervening aggregation node 131, decapsulate the data units, and then send the decapsulated data units to the router 154, from which the decapsulated data units are further forwarded to a destination in the network 102. Similarly, the core device 121 can be configured to receive data units of a wireless session or a wired session from the router 154 destined to the access node 145, encapsulate the data units according to a tunneling protocol for the tunnel 12, and then send the encapsulated data units to the access node 145 via the tunnel 12 through the intervening aggregation node 132, where the encapsulated data units are decapsulated and then forwarded to the user device 197.

In some other embodiments, a core device can be configured to transmit data units to and/or receive data units from an aggregation node or other nodes without using a tunnel. In such embodiments, the data units can be routed or switched at the core device, the aggregation node and/or other nodes based on an appropriate protocol (e.g., Internet Protocol (IP) routing). For example, the core device, the aggregation node and/or other nodes can act as a router sending and receiving data units in layer 3 (i.e., network layer) of the open systems interconnection (OSI) model. In the example of FIG. 1, the core device 122 can be configured to transmit data units to and receive data units from the aggregation node 132 without using a tunnel. Similarly, in response to receiving data units from the core device 122 or the access node 147, the aggregation node 132 can be configured to switch or route received data units toward the destination of the data units based on, for example, an IP routing service.

In some embodiments, a centralized core architecture can be implemented in a converged network such as the network 100. The core devices of the network 100 can provide a single point of configuration and management, and a single anchoring point, for all network services as well as a single logic point of interaction for authentication, visibility and monitoring applications. As a result, various types of services can be aggregated and/or consolidated at one or more core devices, such as virtual local area network (VLAN), firewall, intrusion detection policy (IDP), virtual private network (VPN) termination, load balancing, and/or the like. Particularly, core devices in the network 100 can be used as anchoring points for enforcing a centralized downstream policy for each VLAN, implementing and managing downstream sessions for each VLAN, and transmitting VLAN traffic, as described in detail below.

In a converged network such as the network 100, a VLAN can include multiple devices (e.g., user devices, access nodes) across the network. For example, a VLAN can include the user devices 191, 193, 197, and the access nodes 141, 145; another VLAN can include the user devices 195, 199, and the access nodes 143, 147. Furthermore, communication sessions associated with a VLAN can be identified by, for example, a virtual group identifier that is uniquely designated to that VLAN. Specifically, each data unit (e.g., data packet, data cell, data frame) from a communication session of the VLAN (e.g., destined to and/or sent from a device of the VLAN) can be tagged by the virtual group identifier that is included in the data unit. As a result, an intermediary device (e.g., a routing device, a switching device) such as a core device can determine, based on the virtual group identifier included in the data unit, that the data unit is associated with the VLAN.

In some embodiments, such a virtual group identifier can be determined, at a router connecting the network 100 and another network (the router can be considered to be included in the network 100 (as shown in FIG. 1) or in the other network), for each data unit from downstream traffic associated with a VLAN when the downstream traffic is received at the router from the other network. The virtual group identifier can be determined at, for example, an interface of the router based on a destination address (e.g., a destination IP address) within the data unit. The determined virtual group identifier is included in the data unit at the router. The data unit including the virtual group identifier is then sent from the router to the core device. For example, upon receiving downstream traffic associated with a VLAN from a device within the network 102, the router 154 can determine a virtual group identifier designated to that VLAN for each data unit from the downstream traffic, and include the determined virtual group identifier in the data unit. The router 154 can then send the data unit including the virtual group identifier to the core device 121 based on the virtual group identifier (i.e., the core device 121 is a master device for that VLAN, as described below).

In some embodiments, core devices in the network 100 can be designated as anchoring points for VLANs. Specifically, a first core device can be designated as a master device for a VLAN, and a second core device can be designated as a back-up device for that VLAN. As described in detail below, the core device designated as the master device for a VLAN functions as a primary anchor for that VLAN, and the core device designated as the back-up device for a VLAN functions as a back-up anchor for that VLAN.

The core devices can be designated as anchoring points for VLANs in various methods. In some embodiments, for example, a control device (shown as 110 in FIG. 1) can perform the designating function (i.e., designate a core device as a master device and a core device as a back-up device for each VLAN) by using a specific VLAN-load-distribution method. The control device 110 can then send a signal to each designated core device with instructions for that core device to be appropriately configured. In response to the signal, a designated core device can be configured based on the instructions such that the core device can function as a master device or a back-up device for the VLAN. In some other embodiments, for example, the designating function can be performed manually by an administrator of the network 100.

In some embodiments, core devices can be designated as anchoring points for VLANs based on various considerations such as, for example, traffic load on a core device, number of active sessions in a VLAN, physical and/or logical distance between a core device and devices of a VLAN, and/or the like. For example, a core device with a light traffic load has a higher probability to be designated as a master device for a VLAN; while a core device with a heavy traffic load has a higher probability to be designated as a back-up device for a VLAN. For another example, a core device with a larger capacity can be designated as a master device for a VLAN with a large number of active sessions; while a core device with a smaller capacity can be designated as a master device for a VLAN with a small number of active sessions.

In some embodiments, a core device can be designated as a master device or a back-up device for more than one VLAN at the same time. In some embodiments, an arbitrary number of VLANs can be dynamically load-balanced among core devices. That is, depending on changes in the traffic load, the number of active sessions in a VLAN and/or other factors, a core device can be dynamically designated or de-designated as an anchoring point (e.g., master device, back-up device) for a VLAN.

Additionally, in some embodiments, the information of a core device being designated as the master device for a VLAN can be distributed to the access nodes of the VLAN, such that the identity of the master device is available at each access node of the VLAN. In some embodiments, the core device can be configured to, upon being designated as the master device for the VLAN, broadcast a message to each access node of the VLAN. In other embodiments, the information can be distributed to the access nodes of the VLAN in any other suitable means such as being distributed by a control device or an administrator of the network.

After being designated as the master device for a VLAN, a core device is responsible for both forwarding traffic for that VLAN and advertising subnet routes for that VLAN. On one hand, the core device can be configured to advertise subnet routes for the VLAN by sending information associated with the subnet routes for the VLAN to the upstream routers and/or other devices coupled to the core device. Any core device that is not the master device for a VLAN will not advertise subnet routes for that VLAN. Thus, the upstream routers receive information of subnet routes for a VLAN only from the master device for that VLAN. The upstream routers can route downstream traffic for a VLAN based on the received subnet routes for the VLAN using, for example, Equal-Cost Multi-Path (ECMP) routing. As a result, the upstream routers send all the downstream traffic for the VLAN to the core device designated as the master device for the VLAN. Furthermore, the core device designated as the master device can be configured to forward the received downstream traffic for the VLAN to each destined access node. Thus, all the downstream sessions for each VLAN are anchored at a respective single core device that functions as the master device for that VLAN, which allows for a simple centralized downstream policy for each VLAN and its downstream sessions to be implemented and enforced at that single core device. In addition, as described above, the downstream traffic can be sent from the master device to an access node using a tunnel through intermediate device(s) (e.g., an aggregation node).

On the other hand, each access node of the VLAN can be configured to send upstream traffic (e.g., data units in an upstream data stream) associated with the VLAN to the core device that is designated as the master device for the VLAN. As a result, all upstream traffic of the VLAN is sent to and then forwarded from that core device. In some embodiments, as described above, the traffic can be sent from the access node to the core device using a tunnel through intermediate device(s) (e.g., an aggregation node). In such embodiments, the access nodes do not need to execute any spanning tree protocol (STP) such as the multiple spanning tree protocol (MSTP) or the VLAN spanning tree protocol (VSTP) to achieve loop-free forwarding and traffic load balancing. Instead, the loop-free forwarding and traffic load balancing can be achieved by appropriately designating core devices as master devices for VLANs, and the access nodes only need to send the upstream traffic for the VLANs to the corresponding core devices (i.e., the core devices designated as a master device for a VLAN) via tunnels.

In some embodiments, a core device designated as the back-up device for a VLAN can provide redundancy to the anchoring functionality (e.g., traffic forwarding, route advertising) for the master device of the VLAN. Specifically, if the master device of the VLAN fails to perform the anchoring functionality (e.g., unable to forward upstream traffic, unable to advertise subnet routes) for the VLAN, the master device can be de-designated, and the back-up device of the VLAN can be designated as the new master device and start to perform the anchoring functionality. In some embodiments, if the core device de-designated from the master device role is capable of functioning as a back-up device for the VLAN, that core device can be designated as the new back-up device for the VLAN. Otherwise if the core device de-designated from the master device role is not capable of functioning as a back-up device for the VLAN (e.g., the core device is damaged), a third core device can be (temporarily) designated as the new back-up device for the VLAN. Furthermore, in some embodiments, the core device de-designated form the master device role can be designated as the back-up device for the VLAN to replace the third core device once that de-designated core device is capable of functioning as the back-up device for the VLAN (e.g., the de-designated core device is repaired). In some embodiments, more than one core device can be designated as back-up devices for a VLAN. In such embodiments, each of the back-up devices can be associated with a different priority such that the back-up devices can be designated as the master device in an order based on their priorities, when the master device and/or other back-up devices fail.

Figure 2:
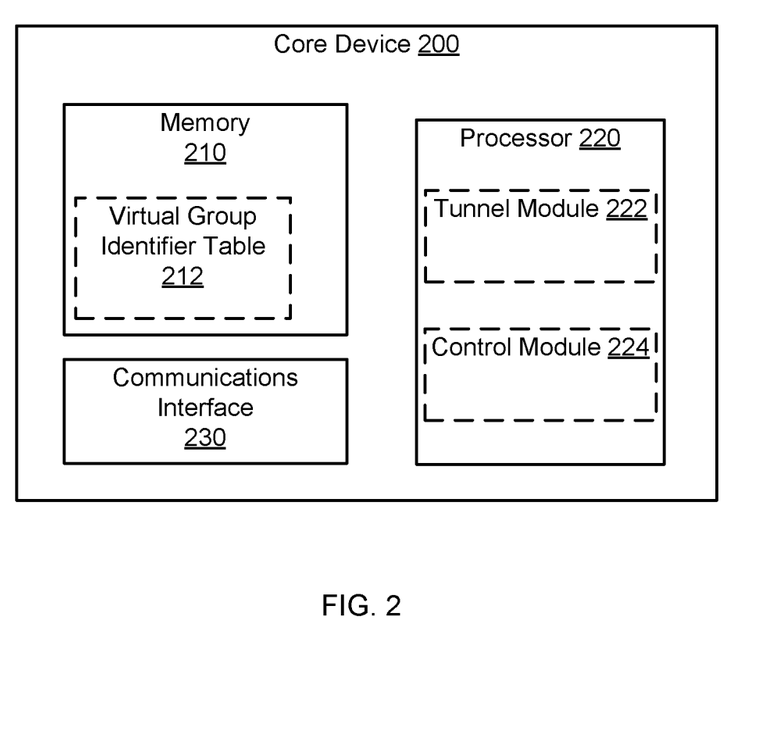
FIG. 2 is a block diagram of a core device, according to an embodiment.

FIG. 2 is a block diagram of a core device 200, according to an embodiment. Similar to the core device 121 and the core device 122 in the network 100 shown in FIG. 1, the core device 200 can be any switching device positioned in the physical core, or backbone, of a network (e.g., a converged wired/wireless network), which is configured to operatively couple the remaining devices (e.g., aggregation nodes, access nodes) of the network to one or more other networks that provide access to data resources and/or information services. Particularly, the core device 200 is configured to, for example, be designated and function as a master device or a back-up device for a VLAN.

As shown in FIG. 2, the core device 200 includes a communications interface 230; a memory 210 that includes a virtual group identifier table 212; and a processor 220 that includes a tunnel module 222 and a control module 224. Each operation(s) of the communications interface 230 (e.g., transmit/receive data), the tunnel module 222 (e.g., encapsulate/decapsulate data units), and the control module 224 (e.g., advertise subnet routes for a VLAN, forward upstream and downstream traffic for a VLAN), as well as manipulations on the virtual group identifier table 212 (e.g., modify an entry) or other portions of the memory 210, can be controlled by the processor 220.

The communications interface 230 of the core device 200 can include, for example, at least two ports (not shown in FIG. 2) that can be used to implement one or more wired connections between the core device 200 and one or more aggregation nodes, one or more access nodes, other core devices, upstream routers, and/or devices of other networks. The wired connections can be, for example, twisted-pair electrical signaling via electrical cables, fiber-optic signaling via fiber-optic cables, and/or the like. As such, the core device 200 can be configured to receive data and/or send data through one or more ports of the communications interface 230, which are connected with the communications interfaces of one or more aggregation nodes, one or more access nodes, other core devices, upstream routers, and/or devices of other networks. Furthermore, in some embodiments, the core device 200 can implement a wired connection with one of an aggregation node, an access node, another core device, an upstream router, or a device of another network through one port of the communications interface 230, while implementing a different wired connection with another aggregation node, access node, core device, upstream router, or device of another network through another port of the communications interface 230.

In some embodiments, as described with respect to FIG. 1, the core device 200 can be configured to prepare a data unit (e.g., data packet, data cell, data frame) to be sent to an access node via a tunnel (e.g., an Ethernet-over-layer-3 tunnel (e.g., Ethernet-in-GRE, CAPWAP, etc.), a MPLS tunnel). The core device 200 can also be configured to receive and decapsulate an encapsulated data unit from an access node via a tunnel. Furthermore, the core device 200 can be configured to forward data units to and/or receive data units from other network devices that are operatively coupled to the core device 200, including other core devices, aggregation nodes, upstream routers and/or devices in other networks, without using any tunneling technology.

The processor 220 can be any suitable processor configured to run and/or execute the modules included in the processor 220. Each module in the processor 220 can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor 220) capable of performing one or more specific functions associated with that module.

The tunnel module 222 is configured to encapsulate data units before sending the encapsulated data units to an access node via a tunnel, and decapsulate data units that are received from an access node via a tunnel such that the decapsulated data units can be further forwarded to, for example, an upstream router. The control module 224 is configured to manage the anchoring functionality of the core device 200 with respect to one or more VLANs. Specifically, the control module 224 is configured to maintain and update the virtual group identifier table 212; advertise subnet routes of VLANs (for which the core device 200 is designated as a master device) to upstream routers; receive and forward upstream traffic and downstream traffic for VLANs (for which the core device 200 is designated as a master device) based on information stored in the virtual group identifier table 212; and/or the like.

In some embodiments, the memory 210 can be, for example, a random-access memory (RAM) (e.g., a dynamic RAM, a static RAM), a flash memory, a removable memory, and/or so forth. The control information associated with performing the anchoring functionality for VLAN(s) can be stored in the memory 210. For example, information associated with virtual group identifiers and the status of the core device 200 with respect to each VLAN can be stored in the virtual group identifier table 212, as shown and described in detail with respect to FIG. 3. For another example, although not shown in FIG. 2, information associated with subnet routes of a VLAN, for which the core device 200 is designated as the master device, can be stored in a database in the memory 210.

Although shown in FIG. 2 as the virtual group identifier table 212 being included in the memory 210 of the core device 200, in some embodiments, the virtual group identifier table 212 can be located in a memory within a separate device (e.g., a storage device) that is operatively coupled to and accessible to the core device 200. Additionally, in some embodiments, data other than the control information associated with performing the anchoring functionality for VLAN(s) can also be stored in the memory 210. For example, information associated with tunneling data units to one or more access nodes can be stored in the memory 210, such that establishing a tunnel (e.g., a MPLS tunnel, an Ethernet-over-layer-3 tunnel) with one of the access nodes can be initialized by the core device 200.

Figure 3:
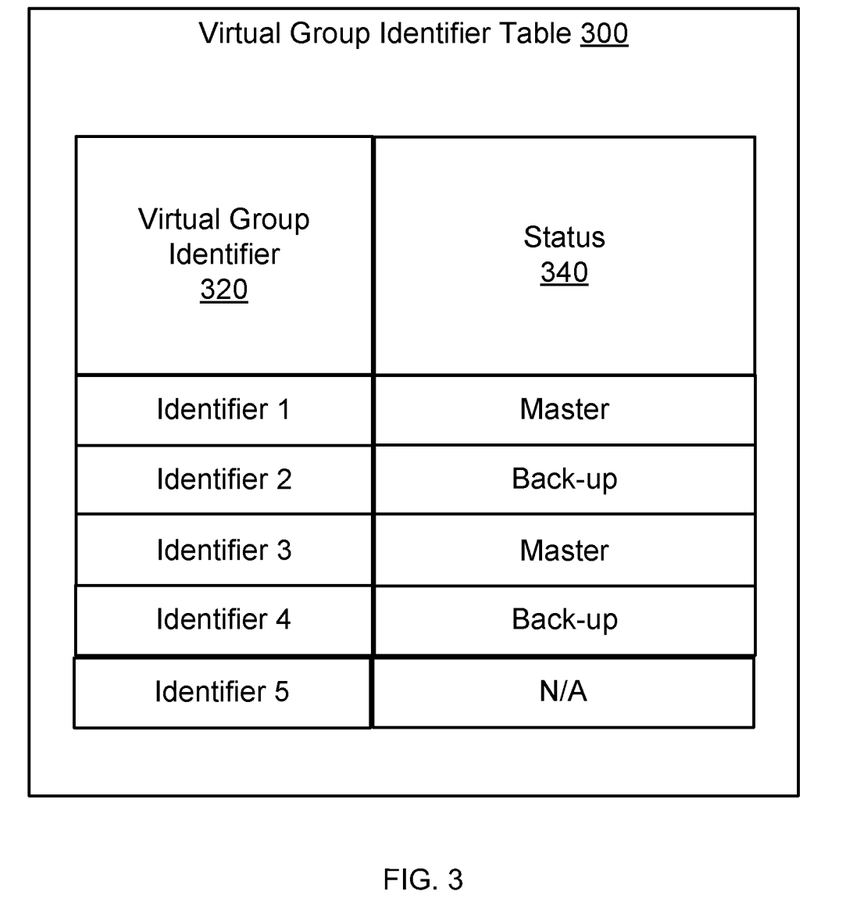
FIG. 3 is a schematic illustration of a virtual group identifier table implemented in a core device, according to an embodiment.

FIG. 3 is a schematic illustration of a virtual group identifier table 300 implemented in (or accessible to) a host core device, according to an embodiment. The virtual group identifier table 300 can be similar to the virtual group identifier table 212 in FIG. 2. The host core device can be similar to the core devices 121, 122 in FIG. 1, and the core device 200 in FIG. 2. The virtual group identifier table 300 has two columns, shown as virtual group identifier 320 and status 340. Each entry (i.e., row) of the virtual group identifier table 300 defines a status of the host core device with respect to the VLAN represented by the virtual group identifier stored in that entry.

Specifically, the first column, virtual group identifier 320, contains virtual group identifiers (e.g., identifier 1, 2, 3, 4, 5), each of which uniquely identifies a VLAN associated with the host core device. A virtual group identifier can be, for example, a number, a text string, a symbol, a binary data or in any other suitable format that can be used to uniquely identify a VLAN. The second column, status 340, contains a status indicator (e.g., master device, back-up device, not available (N/A)) of the host core device with respect to the corresponding VLAN. A status indicator in the virtual group identifier table 300 can be, for example, a number, a text string, a symbol, a binary data or in any other suitable format that can be used to distinguish the status from other statuses.

In the example of FIG. 3, the host core device is designated and functions as a master device for a VLAN identified by the virtual group identifier 1 and a VLAN identified by the virtual group identifier 3; the host core device is designated and functions as a back-up device for a VLAN identified by the virtual group identifier 2 and a VLAN identified by the virtual group identifier 4; the host core device is not designated as either a master device or a back-up device for a VLAN identified by the virtual group identifier 5.

In some embodiments, the virtual group identifier table 300 can be maintained and updated by, for example, a control module (e.g., the control module 224 in FIG. 2) of the host core device. For example, when the host core device fails and is de-designated from the role of the master device for the VLAN identified by the virtual group identifier 1, the control module can be configured to change the status in the first entry of the virtual group identifier table 300 (i.e., corresponding to the virtual group identifier 1) from master to N/A or back-up. For another example, when the host core device is designated as the master device (e.g., from the back-up device) for the VLAN identified by the virtual group identifier 2, the control module can be configured to change the status in the second entry of the virtual group identifier table 300 (i.e., corresponding to the virtual group identifier 2) from back-up to master. Additionally, in some embodiments, when the host core device is not configured to function as a master device or back-up device for one or more VLANs, the host core device can be configured to, for example, automatically change the corresponding status indicator(s) in the virtual group identifier table 300 to "N/A."

Returning to FIG. 1, for example, the core device 121 is designated as the master device for a first VLAN that includes the user devices 191, 193 and 197, and the access nodes 141 and 145. The core device 122 is designated as the back-up device for the first VLAN. Specifically, a control device (shown as 110 in FIG. 1) of the network 100 is configured to send signals to the core devices 121 and 122 such that the core devices 121 and 122 are configured to function as the master device and the back-up device for the first VLAN, respectively, based on instructions included in the signals. Similarly, the core device 122 is designated and configured to function as the master device for a second VLAN that includes the user devices 195 and 199, and the access nodes 143 and 147. The core device 121 is designated and configured to function as the back-up device for the second VLAN.

After being designated as the master device for the first VLAN, the core device 121 is configured to advertise subnet routes for the first VLAN by sending information of those subnet routes to the upstream routers 152 and 154. No other core device, including the core device 122 as the back-up device for the first VLAN, is configured to advertise any of the subnet routes for the first VLAN. Thus, the upstream routers 152 and 154 receive information of subnet routes for the first VLAN only from the core device 121. As a result, by using a routing protocol (e.g., ECM' routing) based on the received information of subnet routes for the first VLAN, the upstream routers 152 and 154 are configured to send all the downstream traffic for the first VLAN to the core device 121. The core device 121 is then configured to forward the downstream traffic for the first VLAN to the destined access nodes (e.g., the access nodes 141, 145) via tunnels (e.g., the tunnels 11, 12).

On the other hand, after the information of the core device 121 being designated as the master device for the first VLAN is distributed to the access nodes (e.g., the access node 141 or 145) of the first VLAN, each access node of the first VLAN is configured to send any upstream traffic of the first VLAN to the core device 121 via a tunnel (e.g., the tunnels 11, 12), without executing any STP (e.g., MSTP, VSTP) at the access node. The core device 121 is then configured to forward the upstream traffic for the first VLAN to the destined devices or networks (e.g., the network 102).

If the core device 121 fails to function as the master device for the first VLAN (e.g., a link breaks down, a connection is lost, the core device is damaged), in some embodiments, the control device (shown as 110 in FIG. 1) sends a signal to the core device 121 to de-designate the core device 121 from the role of master device for the first VLAN. The control device 110 also sends a signal to the core device 122 to designate the core device 122 as the new master device for the first VLAN. The core device 122 is then configured to function as the master device for the first VLAN in a similar way to the core device 121 as described above. In some other embodiments, the core device 121 can detect the failure and automatically stop operating as the master device for the first VLAN without any intervene from an external entity (e.g., the control device 110). Similarly the core device 122 can, based on the detection of the failure at the core device 121, start operating as the master device for the first VLAN. In addition, the information of the change on the master device for the first VLAN can be distributed (e.g., by the control device 110, by the core device 122) to the access nodes of the first VLAN, such that the access nodes are updated with the change. Furthermore, the control device 110 sends a signal to the core device 121 or another core device (depending on the status of the core device 121) to designate the core device 121 or the other core device as the new back-up device for the first VLAN.

Figure 4:
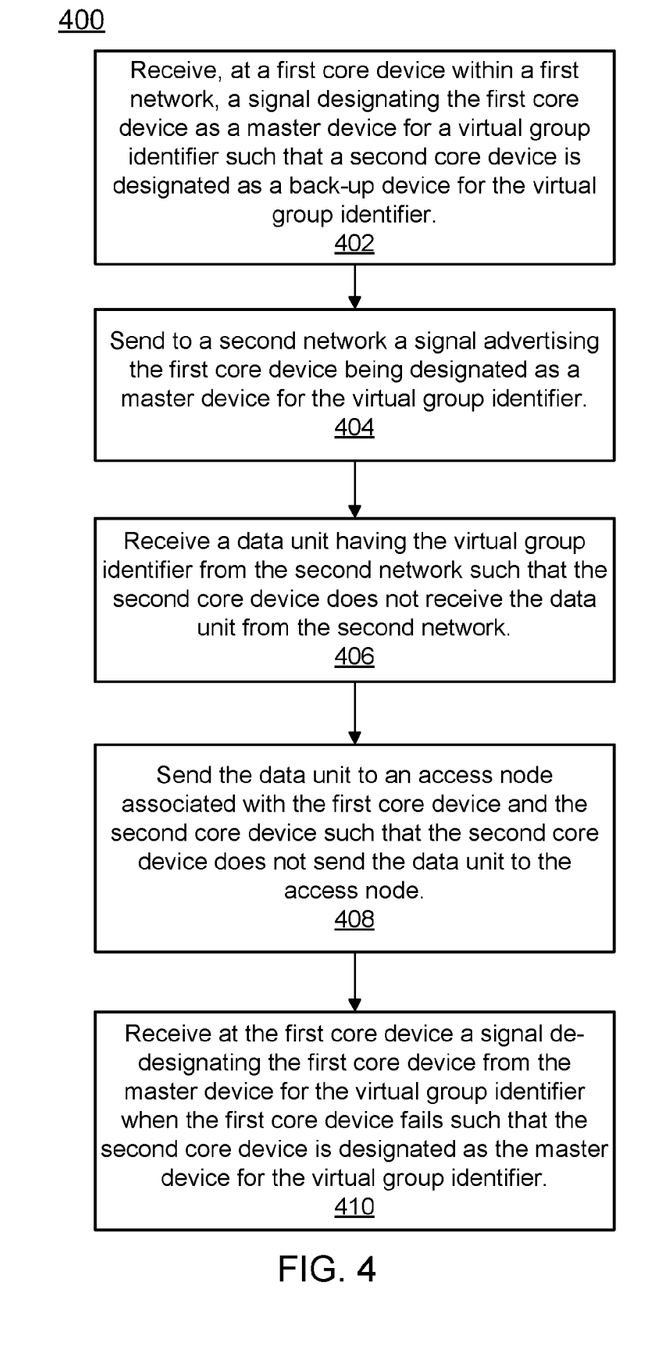
FIG. 4 is a flow chart of a method for designating core devices as master device and back-up device for a virtual group identifier, according to an embodiment.

FIG. 4 is a flow chart of a method 400 for designating core devices as master device and back-up device for a virtual group identifier, according to an embodiment. The core devices described in the method 400 can reside in a first network (e.g., a converged wireless and wired network similar to the network 100 in FIG. 1) and similar to the core devices 121, 122 in FIG. 1 and the core device 200 in FIG. 2. The virtual group identifier is uniquely associated with a VLAN in the first network.

At 402, a first core device within the first network receives a signal designating the first core device as a master device for the virtual group identifier (i.e., for the VLAN identified by the virtual group identifier), such that a second core device within the first network is designated as a back-up device for the virtual group identifier (i.e., for the VLAN identified by the virtual group identifier). In some embodiments, the signal can be received from, for example, a control device of the first network. The first core device and the second core device can receive signals from the control device such that the first core device is designated as the master device for the virtual group identifier and the second core device is designated as the back-up device for the virtual group identifier.

At 404, the first core device sends to a second network a signal advertising the first core device being designated as a mater device for the virtual group identifier. In some embodiments, the first core device also sends a signal containing information of the subnet routes associated with the virtual group identifier (e.g., routes to devices within the VLAN identified by the virtual group identifier) to the second network or other devices (e.g., routers) that connect the first core device to the second network. Furthermore, no other device including the second core device advertises the subnet routes associated with the virtual group identifier to the second network or any other device.

As a result, at 406, the first core device receives a data unit having the virtual group identifier from the second network such that the second core device does not receive the data unit from the second network. Particularly, all the downstream traffic associated with the virtual group identifier (e.g., traffic destined to devices within the VLAN identified by the virtual group identifier) from the second network is sent to the first core device, but not to any other core device including the second core device. That is, the first core device, as the master device for the virtual group identifier, functions as an anchoring point for the downstream traffic associated with the virtual group identifier.

In response to receiving the data unit having the virtual group identifier, at 408, the first core device sends the data unit to an access node associated with the first core device and the second core device such that the second core device does not send the data unit to the access node. The access node is operatively coupled to both the first core device and the second core device. In some embodiments, the first core device can send the data unit to the access node via a tunnel (e.g., an Ethernet-over-layer-3 tunnel, a MPLS tunnel) that connects the first core device and the access node through intermediate node(s) (e.g., an aggregation node).

At 410, the first core device receives a signal de-designating the first core device from the master device for the virtual group identifier when the first core device fails such that the second core device is designated as the master device for the virtual group identifier. Similarly stated, after the first core device fails to function as the master device for the virtual group identifier, the second core device, as the back-up device for the virtual group identifier, is designated as the new master device for the virtual group identifier, and the first core device is de-designated from the role of the master device for the virtual group identifier. Thus, the second core device performs the function of the master device for the virtual group identifier in a similar way to the first core device as described in steps 404-408 above. Furthermore, depending on the status of the first core device, the first core device can be designated as the new back-up device for the virtual group identifier; or alternatively, another core device can be designated as the new back-up device for the virtual group identifier.

Some embodiments described herein relate to devices (e.g., access points, mobile communication devices) with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a first core device configured to be disposed within a network having a plurality of access nodes and a second core device, the first core device including:
a memory, and
a processor operatively coupled to the memory, the processor configured to receive a first signal designating the first core device as a master device for a first set of virtual group identifiers, the first signal associated with a third signal causing the second core device to be designated as a back-up device for the first set of virtual group identifiers, and the processor configured to receive a second signal designating the first core device as a back-up device for a second set of virtual group identifiers, the second signal associated with a fourth signal causing the second core device to be designated as a master device for the second set of virtual group identifiers, the first set of virtual group identifiers being mutually exclusive from the second set of virtual group identifiers, a destination address of a data unit from a plurality of data units, while communicated within the network, being associated with a virtual group identifier from the first set of virtual group identifiers or a virtual group identifier from the second set of virtual group identifiers.

2. The apparatus of claim 1, wherein:
the first core device configured to receive a data unit having a virtual group identifier from the first set of virtual group identifiers such that the second core device does not receive the data unit.

3. The apparatus of claim 1, wherein:
the network is a first network,
the first core device is configured to receive a data unit having a virtual group identifier from the first set of virtual group identifiers,
the first core device is configured to be associated with an access node from the plurality of access nodes such that the second core device does not receive the data unit,
the first core device is configured to send the data unit having the virtual group identifier to a second network such that the second core device does not send the data unit having the virtual group identifier.

4. The apparatus of claim 1, wherein:
the network is a first network,
the first core device is configured to receive a data unit having a virtual group identifier from the first set of virtual group identifiers,
the first core device is configured to be associated with a second network such that the second core device does not receive the data unit having the virtual group identifier, and
the first core device is configured to send the data unit having the virtual group identifier to an access node from the plurality of access nodes such that the second core device does not send the data unit having the virtual group identifier to the access node.

5. The apparatus of claim 1, wherein:
the network is a first network,
the first core device is configured to send to a second network a third signal advertising the first core device being designated as the master device for the first set of virtual group identifiers after receiving the first signal designating the first core device as the master device for the first set of virtual group identifiers,
the first core device is configured to receive a data unit having the virtual group identifier from the second network such that the second core device does not receive the data unit from the second network, after the first core device sends the third signal advertising the first core device being designated as the master device.

6. The apparatus of claim 1, wherein:
the first core device is configured to receive the first signal designating the first core device as the master device for the first set of virtual group identifiers for a first time period, and the first core device is configured to be de-designated from the master device for the first set of virtual group identifiers during a second time period after the first time period when the first core device fails such that the second core device is designated as the master device for the first set of virtual group identifiers during the second time period.

7. A method, comprising:

receiving a first signal designating a first core device as a master device for a virtual group identifier, the first signal associated with a third signal causing a second core device to be designated as a back-up device for that virtual group identifier, the first core device and the second core device being disposed within a first network having a plurality of access nodes, the virtual group identifier being associated with a destination address of a data unit while being communicated within the first network; and sending to a second network a second signal (1) advertising the first core device being designated as the master device for the virtual group identifier after receiving the first signal designating the first core device as the master device of the virtual group identifier and (2) resulting in causing the second core device to not advertise to the second network that the first core device is designated as the master device for the virtual group identifier.

8. The method of claim 7, further comprising:

receiving a data unit having the virtual group identifier such that the second core device does not receive the data unit.

9. The method of claim 7, further comprising:

receiving a data unit having the virtual group identifier;

associating the first core device with an access node from the plurality of access nodes such that the second core device does not receive the data unit; and sending the data unit having the virtual group identifier to the second network such that the second core device does not send the data unit having the virtual group identifier.

10. The method of claim 7, further comprising:

receiving a data unit having the virtual group identifier, associating the first core device with the second network such that the second core device does not receive the data unit having the virtual group identifier, and sending the data unit having the virtual group identifier to an access node from the plurality of access nodes such that the second core device does not send the data unit having the virtual group identifier to that access node.

11. The method of claim 7, further comprising:

receiving a data unit having the virtual group identifier from the second network such that the second core device does not receive the data unit from the second network, after sending the second signal advertising the first core device being designated as the master device.

12. The method of claim 7, further comprising:

receiving the first signal designating the first core device as the master device for the virtual group identifier for a first time period; and receiving a third signal de-designating from the master device for the virtual group identifier during a second time period after the first time period when the first core device fails and the second core device is designated as the master device for the virtual group identifier during the second time period.

13. The method of claim 7, wherein the virtual group identifier is from a first set of virtual group identifiers mutually exclusive from a second set of virtual group identifiers, further comprising:

receiving a third signal designating the first core device as a master device for the first set of virtual group identifiers, the second core device being designated as a back-up device for the first set of virtual group identifiers; and receiving a fourth signal designating the first core device as a back-up device for the second set of virtual group identifiers, the second core device being designated as a master device for the second set of virtual group identifiers.

14. A method, comprising:

receiving a first signal designating as a back-up device for a virtual group identifier from a plurality of virtual group identifiers during a first time period while a second core device is designated as a master device for the virtual group identifier during the first time period, a first core device and the second core device being disposed within a first network having a plurality of access nodes, the virtual group identifier being associated with a destination address of a data unit while being communicated within the first network;

receiving a second signal designating the first core device as the master device for the virtual group identifier during a second time period after the first time period after the second core device fails; and sending, from the first core device to a second network during a third time period a third signal (1) advertising the first core device being designated as the master device for the virtual group identifier after receiving the second signal designating the first core device as the master device of the virtual group identifier and (2) resulting in causing the second core device to not advertise to the second network during the third time period that the first core device is designated as the master device for the virtual group identifier.

15. The method of claim 14, further comprising:

receiving a data unit having the virtual group identifier during the second time period such that the second core device does not receive the data unit during the second time period.

16. The method of claim 14, further comprising:

receiving during the second time period a data unit having the virtual group identifier;

associating the first core device with an access node from the plurality of access nodes such that the second core device does not receive the data unit having the virtual group identifier during the second time period; and sending the data unit having the virtual group identifier to the second network during the second time period such that the second core device does not send the data unit having the virtual group identifier during the second time period.

17. The method of claim 14, further comprising:

receiving during the second time period a data unit having the virtual group identifier;

associating the first core device with the second network such that the second core device does not receive the data unit having the virtual group identifier during the second time period; and sending during the second time period the data unit having the virtual group identifier to an access node from the plurality of access nodes such that the second core device does not send the data unit having the virtual group identifier to the access node during the second time period.

18. The method of claim 14, further comprising:
receiving during the second time period a data unit having the virtual group identifier from the second network such that the second core device does not receive the data unit from the second network during the second time period, after sending the signal advertising the first core device being designated as the master device.

19. The method of claim 14, wherein the virtual group identifier is from a first set of virtual group identifiers mutually exclusive from a second set of virtual group identifiers, further comprising:
receiving a fourth signal designating the first core device as a back-up device for the first set of virtual group identifiers during the first time period such that the second core device is designated as a master device for the first set of virtual group identifiers for the first time period; and
receiving a fifth signal designating the first core device as a master device for the second set of virtual group identifiers during the first time period such that the second core device is designated as a back-up device for the second set of virtual group identifiers during the first time period.

20. The method of claim 14, wherein
receiving a data unit having the virtual group identifier during the second time period via a tunnel such that the second core device does not receive the data unit during the second time period.

* * * * *